United States Patent
Chehab et al.

(10) Patent No.: US 11,654,516 B2
(45) Date of Patent: May 23, 2023

(54) ALUMINIUM MULTILAYER BRAZING SHEET FOR FLUXFREE BRAZING

(71) Applicant: CONSTELLIUM NEUF-BRISACH, Biesheim (FR)

(72) Inventors: Bechir Chehab, Voiron (FR); Carole Loable, Courbevoie (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 0 days.

(21) Appl. No.: 16/771,611

(22) PCT Filed: Dec. 10, 2018

(86) PCT No.: PCT/EP2018/084091
§ 371 (c)(1),
(2) Date: Jun. 10, 2020

(87) PCT Pub. No.: WO2019/115422
PCT Pub. Date: Jun. 20, 2019

(65) Prior Publication Data
US 2021/0170532 A1   Jun. 10, 2021

(30) Foreign Application Priority Data
Dec. 12, 2017   (FR) .................................... 1762018

(51) Int. Cl.
*B23K 35/02* (2006.01)
*C22C 21/02* (2006.01)
(Continued)

(52) U.S. Cl.
CPC .............. *B23K 35/288* (2013.01); *B23K 1/20* (2013.01); *B23K 35/0238* (2013.01);
(Continued)

(58) Field of Classification Search
None
See application file for complete search history.

(56) References Cited

U.S. PATENT DOCUMENTS

| 4,586,964 A | * | 5/1986 | Finnegan | ............. B23K 35/286 228/173.4 |
| 4,908,184 A | * | 3/1990 | Kaifu | ................... B23K 35/286 420/534 |

(Continued)

FOREIGN PATENT DOCUMENTS

| CA | 3000886 A1 | 4/2017 |
| EP | 1351794 B1 | 10/2003 |

(Continued)

OTHER PUBLICATIONS

International Search Report for Application No. PCT/EP2018/084091 dated Mar. 8, 2019.
(Continued)

*Primary Examiner* — Devang R Patel
(74) *Attorney, Agent, or Firm* — McBee, Moore & Vanik IP, LLC

(57) ABSTRACT

The present invention relates to a process for the production of an aluminium multilayer brazing sheet which comprises a core layer made of a 3xxx alloy comprising 0.1 to 0.25 wt. % Mg, a brazing layer made of a 4xxx alloy on one or both sides of the core layer, and optionally an interlayer between the core layer and the brazing layer on one or both sides of the core layer, the process comprising the successive steps of:
providing the layers to be assembled or simultaneous casting of the layers to obtain a sandwich;
rolling of the resulting sandwich to obtain a sheet; and
treating the surface of the sheet with an alkaline or acidic etchant.

16 Claims, 1 Drawing Sheet

(51) Int. Cl.
  *B23K 35/28* (2006.01)
  *B23K 1/20* (2006.01)
  *B32B 15/01* (2006.01)
  *F28F 21/08* (2006.01)
  *C23G 1/12* (2006.01)
  *C23G 1/22* (2006.01)
  *C23F 1/20* (2006.01)
  *C23F 1/36* (2006.01)
  *B23K 103/10* (2006.01)
  *B23K 101/14* (2006.01)

(52) U.S. Cl.
  CPC ............ *B32B 15/016* (2013.01); *C22C 21/02* (2013.01); *C23F 1/20* (2013.01); *C23F 1/36* (2013.01); *C23G 1/125* (2013.01); *C23G 1/22* (2013.01); *F28F 21/084* (2013.01); *F28F 21/089* (2013.01); *B23K 2101/14* (2018.08); *B23K 2103/10* (2018.08)

(56) References Cited

U.S. PATENT DOCUMENTS

| | | | |
|---|---|---|---|
| 9,643,283 B2 * | 5/2017 | Itoh | B23K 1/20 |
| 10,737,357 B2 | 8/2020 | Itoh et al. | |
| 2011/0204124 A1 * | 8/2011 | Wittebrood | B23K 1/0012 |
| | | | 228/219 |
| 2015/0053751 A1 | 2/2015 | Eckhard et al. | |
| 2016/0325367 A1 * | 11/2016 | Eckhard | B23K 35/288 |
| 2017/0151637 A1 * | 6/2017 | Ichikawa | B23K 1/19 |
| 2017/0151638 A1 | 6/2017 | Itoh et al. | |
| 2018/0222151 A1 * | 8/2018 | Eckhard | B23K 35/286 |
| 2019/0077119 A1 * | 3/2019 | Jacoby | C22C 21/14 |
| 2019/0291218 A1 * | 9/2019 | Itoh | B23K 35/0238 |

FOREIGN PATENT DOCUMENTS

| | | | | |
|---|---|---|---|---|
| EP | 1430988 A1 | 6/2004 | | |
| EP | 2660043 A1 | 11/2013 | | |
| EP | 2883650 A1 | 6/2015 | | |
| EP | 2844466 B1 | 9/2016 | | |
| EP | 3231545 B1 | 9/2019 | | |
| FR | 2892038 A1 | 4/2007 | | |
| WO | 2016015917 A1 | 2/2016 | | |
| WO | 2016015974 A1 | 2/2016 | | |
| WO | 2016134967 A1 | 9/2016 | | |
| WO | WO-2017060236 A1 * | 4/2017 | | B23K 35/0233 |
| WO | 2017080771 A1 | 5/2017 | | |
| WO | 2017115597 A1 | 7/2017 | | |

OTHER PUBLICATIONS

French Search Report for Application No. 1762018 dated Jul. 31, 2018.

* cited by examiner

ALUMINIUM MULTILAYER BRAZING SHEET FOR FLUXFREE BRAZING

CROSS-REFERENCE TO RELATED APPLICATIONS

This application is the National Stage entry of International Application No. PCT/EP2018/084091, filed 10 Dec. 2018, which claims priority to French Patent Application No. 1762018, filed 12 Dec. 2017.

BACKGROUND

Field

FIELD OF THE INVENTION

The present invention relates to a pre-treated multilayer brazing sheet, a use thereof in a fluxfree controlled atmosphere brazing (CAB) process, a process for producing said sheet and a process for the production of a brazed piece.

Description of Related Art

There are various brazing processes in use for the industrial scale manufacturing of heat exchangers made of aluminium and aluminium alloys.

There is vacuum brazing which is carried out at relatively low atmosphere pressure in the order of about $1 \times 10^{-4}$ mbar or less. This is a discontinuous process and puts high demands on material cleanliness. To obtain optimum conditions for joining to take place, aluminium alloys commonly used for vacuum brazing contain purposive addition of 1% Mg or more. Mg disrupts the hard oxide film of the filler alloy when it evaporates from the brazing sheet during brazing, and then the evaporated Mg removes oxygen and moisture remaining in the vacuum brazing furnace. However there is always more magnesium present in the furnace than necessary. The excess magnesium condenses on the cold spots in the vacuum brazing furnace and has to be removed frequently. The capital investment for suitable equipment is relatively high.

Another known brazing process is controlled atmosphere brazing (CAB) usually used with flux. Nocolok® flux (potassium fluoroaluminate flux) is widely used in the industrial Controlled Atmosphere Brazing (CAB) of aluminium heat exchangers. The molten flux facilitates brazing by breaking the oxide layer on surfaces and also prevents further oxidation of the molten layer.

Recently, some heat exchangers (in particular with refrigerant circulation) have presented clogging issues linked to a chemical interaction which occurs between the residual flux (remaining flux after brazing) and the cooling liquid. This interaction leads to an increase in the cooling liquid viscosity and consequently to a clogging of the heat exchanger. More specifically, excessive post-braze flux residues may enhance in-service "abrasion" when cooling liquid circulates in the heat exchanger.

Moreover, in the particular case of water charge air cooler (WCAC) or radiator, flux particles on brazed surfaces facing cooling liquid may break free and clog tubes, and have also been reported to accelerate degradation of some cooling liquids to form gels.

Added to this clogging issue, the Nocolok® flux presents also some health and environmental issues.

Moreover, in complex shaped structures the application of a brazing flux prior to brazing at the interior of the structure is often considered very difficult and problematic, leading sometimes to increase the quantity of flux and thus increase the quantity of flux residues.

As a consequence, solutions for brazing in controlled atmosphere brazing (CAB) without any flux have been developed, as illustrated hereinafter.

Patent application EP1430988A1 of Furukawa discloses that for such a process of CAB without using any brazing flux, the brazing sheet has an aluminium or aluminium alloy core clad with a filler alloy layer composed of an Al—Si-based alloy on one or both sides thereof, and contains Mg at least in a layer constituting the brazing sheet other than the filler alloy layer.

Patent application EP2660043A1 and patent EP2844466 of Hydro Aluminium Rolled Product GmbH disclose aluminium brazing sheet product wherein the Al—Si filler layer is etched to facilitate fluxfree brazing. The etching of the Al—Si filler layer includes an alkaline or acidic etchant.

Patent application EP2883650A1 of Hydro Aluminium Rolled Product GmbH discloses a pre-treatment of aluminium brazing sheet for fluxfree brazing, wherein the surface of the aluminium filler layer is treated with an acidic aqueous pickling solution comprising at least a mineral acid and at least one complexing agent or complexing mineral acid. Preferred Al—Si filler materials are selected from the group of AA4343, AA4045 and AA4047.

Patent application WO2017/080771 of Aleris discloses a multilayer heat exchanger with a AA3003/AA3005/AA3105/AA3103 core layer cladded on both sides with a AA4045 brazing layer, etched with an acid pickling solution.

It has however to be noted that fluxfree solutions have sometimes to be flux-tolerant as flux residues may remain in the furnace or some specific areas may be fluxed locally. This point is of particular relevance for industrial production, because a flux-tolerant solution allows using existing brazing equipment, even those using sometimes a flux. Moreover, for some specific uses, some parts of a piece are fluxed whereas the other parts of the same piece are not.

There is thus still a demand for an improved method of fluxfree controlled atmosphere brazing (CAB), in particular to stabilize the brazing performance and to propose fluxfree but flux-tolerant solutions.

As will be appreciated herein below, except as otherwise indicated, aluminium alloy designations and temper designations refer to the Aluminium Association designations in Aluminium Standards and Data and the Registration Records, as published by the Aluminium Association and well known to the persons skilled in the art.

For any description of alloy compositions or preferred alloy compositions, all references to percentages are by weight unless otherwise indicated.

And for the purpose of this invention, and as used hereinafter, the term "controlled atmosphere brazing" or "CAB" refers to a brazing process which utilizes an inert atmosphere, for example nitrogen, argon or helium, in the brazing of the various alloy articles, and is distinct from vacuum brazing in particular in that with CAB the brazing atmosphere in the furnace during the brazing operation is at about regular atmospheric pressure, although a slight under-pressure (for example working at a pressure of 0.1 bar or more) or a slight over-pressure can be used to facilitate the control of the brazing furnace atmosphere.

SUMMARY OF THE INVENTION

It is an object of the present invention to provide a use of a pre-treated aluminium brazing sheet with a specific composition in fluxfree controlled atmosphere brazing (CAB). The solution according to the present invention allows the stabilization of brazing performance. It has also to be noted that the solution according to the present invention is flux-tolerant.

This and other objects and further advantages are met or exceeded by the present invention providing:
a process for the production of an aluminium multilayer brazing sheet which comprises a core layer made of a 3xxx alloy comprising 0.1 to 0.25 wt. % Mg, a brazing layer made of a 4xxx alloy on one or both sides of the core layer, and optionally an interlayer between the core layer and the brazing layer on one or both sides of the core layer, the process comprising the successive steps of:
  providing the layers to be assembled or simultaneous casting of the layers to obtain a sandwich;
  rolling of the resulting sandwich to obtain a sheet; and
  treating the surface of the sheet with an alkaline or acidic etchant.
an aluminium multilayer brazing sheet comprising:
  a core layer made of a 3xxx alloy comprising 0.1 to 0.25 wt. % Mg;
  a brazing layer made of a 4xxx alloy comprising Bi on one or both sides of the core layer; and
  optionally an interlayer between the core layer and the brazing layer on one or both sides of the core layer,
in which the aluminium multilayer brazing sheet is surface treated with an alkaline or acidic etchant before a brazing step.
a use of an aluminium multilayer brazing sheet in a fluxfree controlled atmosphere brazing (CAB), in which the aluminium multilayer brazing sheet is as obtained according to the process as described hereinafter, to stabilize the brazing performance
a process for the production of a brazed piece, comprising the successive steps of:
  providing at least one aluminium multilayer brazing sheet comprising a core layer made of a 3xxx alloy comprising 0.1 to 0.25 wt. % Mg, a brazing layer made of a 4xxx alloy on one or both sides of the core layer, and optionally an interlayer between the core layer and the brazing layer on one or both sides of the core layer, in which the aluminium multilayer brazing sheet is surface treated with an alkaline or acidic etchant; and
  brazing in a fluxfree controlled atmosphere brazing (CAB).

BRIEF DESCRIPTION OF THE DRAWINGS

FIG. 2 is a side view of FIG. 1 according to arrow A.

DETAILED DESCRIPTION OF A PREFERRED EMBODIMENT

Figure 1:
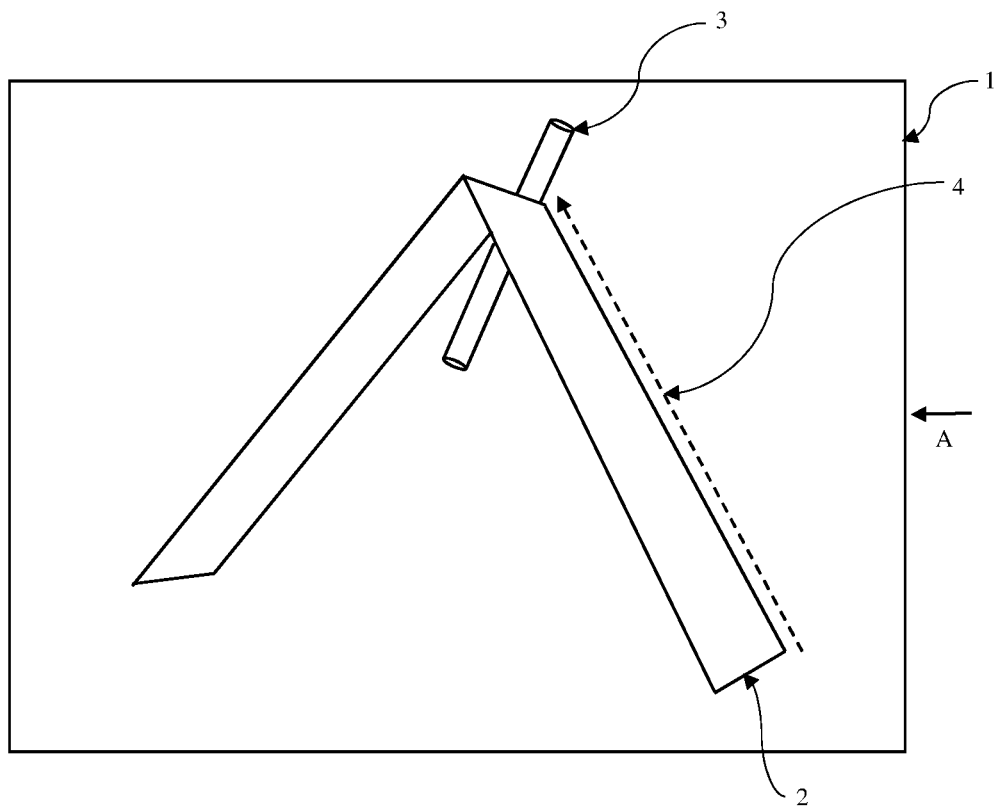
FIGS. 1 and 2 show V configuration brazing samples as discussed in the examples.

Core Layer
The aluminium multilayer brazing sheet used according to the present invention comprises a core layer made of a 3xxx alloy comprising 0.1 to 0.25 wt. % of Mg. Preferably, the upper content of Mg in the core layer is strictly less than 0.20 wt. %, more preferably less than or equal to 0.18 wt. %.

It has to be noted that the quantity of Mg in the core layer according to the present invention makes it at the same time a fluxfree solution and a flux-tolerant solution.

Preferably, the core layer used according to the present invention comprises, more preferably consists essentially of, in weight %:
  Si: up to 0.7%, preferably less than 0.3%, more preferably 0.1 to 0.3%;
  Fe: up to 0.7%, preferably less than 0.3%, more preferably up to 0.2%;
  Cu: 0.3 to 1.1%, preferably 0.6 to 0.95%, more preferably 0.6 to 0.9%;
  Mn: 0.5 to 1.8%, preferably 0.7 to 1.8%, more preferably 1.0 to 1.7%, in particular 1.1 to 1.7%;
  Ti: up to 0.3%, preferably up to 0.25%, more preferably 0.06 to 0.1%;
  Mg: 0.1 to 0.25%;
  Zn: up to 0.1%;
  Zr and/or Cr and/or V: each up to 0.3%;
  other elements less than 0.05% each and less than 0.15% in total; balance being aluminium.

Brazing Layer
The aluminium multilayer brazing sheet used according to the present invention is cladded on one or both sides with a brazing layer made of a 4xxx alloy.

Preferably, the brazing alloy used according to the present invention comprises Bi. The content of Bi in the brazing layer is preferably up to 0.3 wt. %, more preferably 0.1 to 0.3 wt. %, in particular 0.11 to 0.17 wt. %.

Preferably, the brazing layer used according to the present invention comprises, more preferably consists essentially of, in weight %:
  Si: 7 to 13%, preferably 9 to 11%;
  Fe: up to 0.7%, preferably up to 0.6%;
  Cu: up to 0.5%, preferably up to 0.3%, more preferably up to 0.1%;
  Bi: up to 0.3%, preferably 0.1 to 0.3%, more preferably 0.11 to 0.17%;
  Sr: up to 500 ppm, preferably up to 200 ppm;
  other elements less than 0.05% each and less than 0.15% in total; balance being aluminium.

Interlayer
Optionally, the aluminium multilayer brazing sheet used according to the present invention further comprises an interlayer which is present between the core layer and the brazing layer, on one or both sides of the core layer. According to an embodiment, in configurations with four or five layers with only one brazing layer, the interlayer may be present alone on the side of the core where the brazing layer is not present.

According to an embodiment, the interlayer used according to the present invention may comprise, preferably may consist essentially of, in weight percentage:
  up to 0.5% Si,
  up to 0.7% Fe,
  up to 0.3% Cu,
  up to 1.5% Mn,
  up to 1% Mg,
  up to 0.3% Ti,
  other elements less than 0.05% each and less than 0.15% in total, balance being aluminium.

Preferably, the upper limit of Mg in the interlayer is 0.3 wt. %, preferably 0.25 wt. %.

In this embodiment, the solution according to the present invention is flux-tolerant.

For example an interlayer may be used to limit diffusion of alloying elements between the core layer and the brazing layer and/or to further improve the post-braze corrosion performance of the brazing sheet material.

According to a preferred embodiment, the aluminium multilayer brazing sheet used according to the present invention does not comprise any interlayer between the core layer and the brazing layer. This embodiment may be used to maximize the combined effect of the specific content of Mg in the core layer and of the surface treatment according to the present invention on the brazing quality.

Sheet

The aluminium brazing sheet according to the present invention may have two, three, four or five layers. The configuration with two layers is a sheet consisting of a core layer and a brazing layer as described herein before.

The configuration with three layers is a sheet consisting of a core layer and either:
  two brazing layers, each on one side of the core layer, with the same or a different composition; or
  a brazing layer and an interlayer, both on the same side of the core layer; or
  a brazing layer on one side and an interlayer on the other side of the core layer; or
  a brazing layer on one side and a sacrificial layer on the other side of the core layer, the sacrificial layer being for example made of a AA1xxx or a AA7xxx with a low content of Zn (for example an alloy having around 1 to 4 wt. % Zn or AA7072).

The configuration with four layers is a sheet consisting of a core layer, a brazing layer and an interlayer both on one side of the core layer and either:
  a brazing layer on the other side of the core layer, the brazing layers having the same or a different composition; or
  an interlayer on the other side of the core layer; or
  a sacrificial layer on the other side of the core layer.

The configuration with five layers is a sheet consisting of a core layer, a brazing layer and an interlayer both on one side of the core layer and either:
  an interlayer and a brazing layer both on the other side of the core layer, the interlayers and the brazing layers having respectively the same or a different composition; or
  a sacrificial layer and a brazing layer both on the other side of the core layer, the brazing layers having the same or a different composition and being the external layers of the sheet; or
  an interlayer and a sacrificial layer both on the other side of the core layer, the interlayers having the same or a different composition and the sacrificial layer being an external layer of the sheet.

The aluminium multilayer brazing sheet thickness may be in the range of 0.1 to 3 mm, preferably 0.15 to 2 mm, more preferably 0.2 to 1.5 mm.

The ratio of the brazing layer may be from 5 to 15% of the total thickness of the aluminium multilayer brazing sheet.

As an example, the temper of the aluminium multilayer brazing sheet may be a H24, a H116 or O-temper. The temper is known by the person skilled in the art and is described in the standard NF EN 515 of October 1993.

Process

The aluminium multilayer brazing sheet used according to the present invention may be manufactured via various techniques. For example by rolling the layers to be assembled as is well known in the art. Alternatively the brazing layer and the optional interlayer may be applied onto the core layer by means of thermal spraying techniques.

Or alternatively the core layer, the brazing layer and the optional interlayer may be manufactured by means of casting techniques, for example as disclosed in international application WO2004/112992, followed by rolling.

An object of the present invention is a process for the production of an aluminium multilayer brazing sheet which comprises a core layer made of a 3xxx alloy comprising 0.1 to 0.25 wt. % Mg, a brazing layer made of a 4xxx alloy on one or both sides of the core layer, and optionally an interlayer between the core layer and the brazing layer on one or both sides of the core layer, the process comprising the successive steps of:
  providing the layers to be assembled or simultaneous casting of the layers, to obtain a sandwich;
  rolling of the resulting sandwich to obtain a sheet; and
  treating the surface of the sheet with an alkaline or acidic etchant.

As is known by the person skilled in the art, the rolling may be hot and/or cold rolling, in conditions known by the person skilled in the art. The duration and conditions of rolling mainly depend on the desired thickness of the sheet.

The sheet may optionally have been produced using a homogenized core and/or homogenized interlayer(s).

The sheet may optionally be preheated before the rolling step, partially or fully annealed, and/or strained.

Preferably, at least one brazing layer comprises Bi, more preferably up to 0.3 wt. % Bi. In the case where two brazing layers are present, they may have the same or a different composition.

In the case where two interlayers are present, they may have the same or a different composition.

The core layer, the brazing layer, the interlayer and the sheet are the same as those described herein before.

The surface of the aluminium multilayer brazing sheet thus obtained is treated with an alkaline or acidic etchant before the brazing process.

Preferably, the surface of the aluminium multilayer brazing sheet is treated with an acidic etchant. The acidic etchant preferably comprises 10 to 20, more preferably 12 to 16, for example 14 g/L of $H_2SO_4$ and 0.5 to 5, more preferably 1 to 3, for example 2 g/L of HF (5%).

The acidic etchant may comprise at least one of the following mineral acids: $H_2SO_4$, $H_3PO_4$, HCl, HF and/or $HNO_3$. Preferably, the acidic etchant is a mix of $H_2SO_4$ and HF. The acidic etchant is generally in the form of a solution and the mineral acid content is generally from 0.5 to 20 wt. %.

According to another embodiment, the etchant may be alkaline. The alkaline etchant may comprise at least one of the following: NaOH and/or KOH. The alkaline etchant is generally in the form of a solution and the alkaline content is generally from 0.5 to 20 wt. %.

The alkaline etchant may further comprise surfactants (for example, anionic surfactants such as alkylbenzene sulfonates, alkyl sulfates, alkyl ether sulfates; cationic surfactants such as mono alkyl quaternary systems or esterquats; nonionic surfactants such as with ester, ether or amide bonding (for example glycol esters); or amphoteric surfactants such as imidazoline derivatives or polypeptides) or complexing agents (for example sodium gluconate, sorbitol, mucic acid or Arabic gum).

The alkaline etchant generally needs to be rinsed with an acid, for example nitric or sulfuric acid.

The surface treatment with an etchant generally lasts from 1 second to 5 minutes, preferably from 3 to 80 s, more preferably from 5 to 50 s.

The temperature during this surface treatment is generally from 20 to 100° C., preferably from 30 to 80° C., more preferably 50 to 80° C.

During the surface treatment, the amount of removed aluminium of the brazing layer side is 1 to 1000 mg/m²/side, preferably 5 to 500 mg/m²/side, more preferably 5 to 300 mg/m²/side.

Another object of the present invention is an aluminium multilayer brazing sheet comprising:
- a core layer made of a 3xxx alloy comprising 0.1 to 0.25 wt. % Mg;
- a brazing layer made of a 4xxx alloy comprising Bi, on one or both sides of the core layer; and
- optionally an interlayer between the core layer and the brazing layer on one or both sides of the core layer, in which the aluminium multilayer brazing sheet is surface treated with an alkaline or acidic etchant before a brazing step, preferably before a fluxfree controlled atmosphere brazing step.

In the case where two brazing layers are present, they may have the same or a different composition.

In the case where two interlayers are present, they may have the same or a different composition.

The core layer, the brazing layer, the interlayer and the sheet are the same as those described herein before.

The sheet obtained according to the present invention may then be brazed to itself and/or to other aluminium alloy products to obtain a brazed piece, by controlled atmosphere brazing. The brazing temperature may typically be in a range of about 560° C. to 640° C., preferably 590° C. to 610° C., for example at about 590° C., at about 600° C. or at about 610° C.

The brazing inert gas atmosphere should be dry, meaning that the dew point is less than −35° C., preferably less than −40° C., and more preferably of −45° C. or lower.

The brazing atmosphere may for example comprise up to 60 ppm of $O_2$.

The core layer, the brazing layer, the interlayer and the sheet are the same as those described herein before.

Another object of the present invention is the use of an aluminium multilayer brazing sheet in a fluxfree controlled atmosphere brazing (CAB), in which the aluminium multilayer brazing sheet is as obtained according to the process described hereinbefore, to stabilize the brazing performance.

Another object of the present invention is a process for the production of a brazed piece, comprising the successive steps of:
- providing at least one aluminium multilayer brazing sheet comprising a core layer made of a 3xxx alloy comprising 0.1 to 0.25 wt. % Mg, a brazing layer made of a 4xxx alloy on one or both sides of the core layer, and optionally an interlayer between the core layer and the brazing layer on one or both sides of the core layer, in which the aluminium multilayer brazing sheet is surface treated with an alkaline or acidic etchant; and
- brazing in a fluxfree controlled atmosphere brazing (CAB).

The processes, use and sheet according to the present invention have proven to be particularly advantageous in the production of heat exchanger devices having very high requirements on inner cleanliness, in particular oil coolers and charge air coolers.

These heat exchangers are not suitable for production by vacuum brazing, mainly for economic reasons.

The invention is not limited to the embodiments described in the description hereinbefore or in the examples hereinafter, and may be varied widely within the scope of the invention as defined by the appending claims.

Examples

1) Material Preparation:

All the samples tested were aluminium multilayer brazing sheets with a core layer (80% of the total thickness) cladded on both sides with a brazing layer (10% of the total thickness each). They were at O-temper and had a total final thickness of 0.42 mm.

The sandwiches preparation was done as follows:
- lab casting (Direct Chill caster) of the different alloys to get 70 mm thickness blocks;
- scalping of the obtained blocks on both sides until a 55 mm thickness;
- preheat of the clad alloy blocks at 500° C. and hot rolling until a 7 mm thickness;
- homogenization of the core alloy blocks at 620° C. for 8h;
- assembly of the sandwiches;
- preheat of the assembled sandwich at 500° C. and hot rolling until a 3.5 mm thickness;
- cold rolling until a 0.42 mm thickness;
- annealing at 350° C. under $N_2$ atmosphere for 1h to obtain a O-temper.

The samples were then surface treated with an acidic solution comprising 14 g/L of $H_2SO_4$ and 2 g/L HF (5%) at 50° C. for different durations from 0 to 70 s.

Table 2 hereinafter shows the details on the samples tested.

Table 1 shows the specific alloy compositions for the core layers and the brazing layers as used in the examples, in weight percentages.

TABLE 1

Specific alloy compositions tested

|  | Si | Fe | Cu | Mn | Mg | Ti | Sr | Bi |
|---|---|---|---|---|---|---|---|---|
| Core-1 | 0.2 | 0.15 | 0.71 | 1.32 | 0.16 | 0.08 | — | — |
| Core-2 | 0.18 | 0.15 | 0.65 | 1.35 | — | 0.08 | — | — |
| Core-3 | 0.5 | 0.15 | 0.5 | 1.64 | 0.5 | 0.08 | — | — |
| Clad-1 | 9.8 | 0.4 | — | — | — | — | — | — |
| Clad-2 | 9.5 | 0.3 | 0.2 | — | — | 0.02 | 0.01 | 0.14 |

2) Brazing

The trials were performed using V-on-coupon brazing test on a laboratory batch brazing furnace with the following test conditions:
- no sample fluxing before brazing;
- $N_2$ atmosphere;
- $O_2$ lower than 15 ppm;
- 600° C. during 3 min;
- heating up at 9° C./min.

Figure 2:
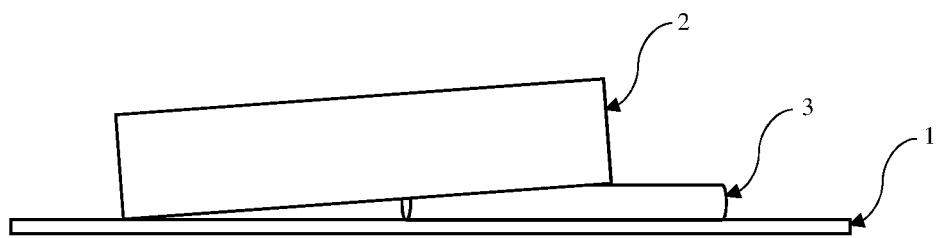

The V shape, each side of the V measuring 30 mm of length and 1 cm of height, was positioned on a coupon with a 1.2 mm diameter stainless steel rod inserted under the V corner as illustrated by FIGS. 1 and 2. The coupons had the same composition as the V (i.e. with clad). In FIGS. 1 and 2, the coupon has the reference number 1, the V has the reference number 2, the stainless steel rod has the reference number 3, and the brazing zone is represented by the arrow with the reference number 4. FIG. 2 is a side view of FIG. 1 according to arrow A.

The results of the V test corresponded to the average brazed length (in mm) measured along the brazing zone 4 (average of the V left and right sides brazed lengths). For each sample several tests were conducted in order to check the reproducibility of results. In Table 3 hereinafter, NR means "not reproducible" and concerns samples for which sometimes no brazing was obtained and sometimes at least a partial brazing has occurred.

3) Results:

Table 2 hereinafter shows the samples tested and the results obtained.

TABLE 2

Samples tested and results obtained

|    | Core layer | Brazing layer | Etching time (s) | Joint formation (mm)-V test |
|----|------------|---------------|------------------|------------------------------|
| A1 | Core-2     | Clad-2        | 0                | 1                            |
| A2 |            |               | 40               | 1                            |
| A3 |            |               | 50               | 1                            |
| B1 | Core-3     | Clad-2        | 0                | NR                           |
| B2 |            |               | 70               | 1                            |
| C1 | Core-1     | Clad-2        | 0                | NR                           |
| C2 |            |               | 25               | 11.4                         |
| C3 |            |               | 40               | 11.4                         |
| C4 |            |               | 50               | 11.4                         |
| C5 |            |               | 60               | 10.2                         |
| C6 |            |               | 70               | 9.7                          |
| D1 | Core-1     | Clad-1        | 0                | 1                            |
| D2 |            |               | 25               | 11.1                         |
| D3 |            |               | 40               | 13                           |
| D4 |            |               | 50               | 11.4                         |

As shown in Table 2 herein above, samples C2 to C6 and D2 to D4 were according to the invention. Samples A1, B1, C1 and D1 were comparative examples at least because of the absence of the surface treatment. Samples A2 and A3 were comparative examples at least because the core layer Core-2 did not comprise enough Mg. Sample B2 was a comparative example at least because the core layer Core-3 comprised too much Mg.

According to Table 2, the surface treatment is necessary to stabilize the brazing performance Indeed, the brazing quality was unstable (i.e. not reproducible) for sample C1 and not good for samples A1, B1 and D1. So a good brazing quality is not guaranteed without any surface treatment.

Then, the claimed Mg quantity is necessary to stabilize the brazing performance.

Indeed, with not enough Mg (see samples A2 and A3) or with too much Mg (see sample B2), the brazing quality was not good.

The Mg content of the core alloy and the surface treatment according to the present invention thus allow together a good brazing quality by stabilizing the brazing performance.

All documents referred to herein are specifically incorporated herein by reference in their entireties.

As used herein and in the following claims, articles such as "the", "a" and "an" can connote the singular or plural.

In the present description and in the following claims, to the extent a numerical value is enumerated, such value is intended to refer to the exact value and values close to that value that would amount to an unsubstantial change from the listed value.

The invention claimed is:

1. A process for the production of an aluminum multilayer hazing sheet which comprises:

a core layer made of a 3xxx alloy consists of, in weight %: up to 0.7% Si, up to 0.7% Fe, 0.3 to 1.1% Cu, 0.5 to 1.8% Mn, up to 0.3% Ti, 0.1 to 0.18% Mg, up to 0.1% Zn, Zr and/or Cr and/or V each up to 0.3%, other elements less than 0.05% each and less than 0.15% in total, balance being aluminum and a brazing layer made of a 4xxx alloy on one or both sides of the core layer, wherein the brazing layer 4xxx alloy consists of, in weight %: 7 to 13% Si, up to 0.7% Fe, up to 0.5% Cu, 0.1 to 0.3% Bi, up to 500 ppm Sr, other elements less than 0.05% each and less than 0.15% in total, balance being aluminum, the process comprising in succession: providing layers to be assembled or simultaneous casting of layers to obtain a sandwich; rolling of a resulting sandwich to obtain a sheet; and treating a surface of the sheet with an alkaline or acidic etchant.

2. The process according to claim 1, further comprising an interlayer comprising, in weight %: up to 0.5% Si, up to 0.7% Fe, up to 0.3% Cu, up to 1.5% Mn, up to 1% Mg, up to 0.3% Ti, other elements less than 0.05% each and less than 0.15% in total, balance being aluminum.

3. The process according to claim 1, in which a surface of the sheet is treated with an acidic etchant.

4. The process according to claim 3, in which the acidic etchant is a mix of $H_2SO_4$ and HF.

5. The process according to claim 1, in which a surface of the sheet is treated at 20 to 100° C. during 3 to 80 s.

6. The process according to claim 1, wherein the Si content in the core layer 3xxx alloy is 0.1 to 0.3 weight %.

7. The process according to claim 1, wherein the Ti content in the core layer 3xxx alloy is 0.06 to 0.1 weight %.

8. The process according to claim 1, wherein the core layer made of a 3xxx alloy includes in weight %: 0.6 to 1.1% Cu.

9. The process according to claim 8, further comprising an interlayer comprising, in weight %: up to 0.5% Si, up to 0.7% Fe, up to 0.3% Cu, up to 1.5% Mn, up to 1% Mg, up to 0.3% Ti, other elements less than 0.05% each and less than 0.15% in total, balance being aluminum.

10. The process according to claim 8, in which a surface of the sheet is treated with an acidic etchant.

11. The process according to claim 10, in which the acidic etchant is a mix of $H_2SO_4$ and HF.

12. The process according to claim 8, in which a surface of the sheet is treated at 20 to 100° C. during 3 to 80 s.

13. The process according to claim 8, wherein the Si content in the core layer 3xxx alloy is 0.1 to 0.3 weight %.

14. The process according to claim 8, wherein the Ti content in the core layer 3xxx alloy is 0.06 to 0.1 weight %.

15. The process according to claim 8, wherein the brazing layer 4xxx alloy, consists of, in weight %: 7 to 13% Si, up to 0.7% Fe, up to 0.5% Cu, 0.1 to 0.3% Bi, up to 500 ppm Sr, other elements less than 0.05% each and less than 0.15% in total, balance being aluminum.

16. The process according to claim 1, further comprising, in weight %: up to 0.5% Si, up to 0.7% Fe, up to 0.3% Cu, up to 1.5% Mn, up to 1% Mg, up to 0.3% Ti, other elements less than 0.05% each and less than 0.15% in total, balance being aluminum.

* * * * *